(12) United States Patent
Sakaguchi et al.

(10) Patent No.: US 9,664,549 B2
(45) Date of Patent: May 30, 2017

(54) FLUID METER DEVICE

(71) Applicant: Panasonic Intellectual Property Management Co., Ltd., Osaka-shi, Osaka (JP)

(72) Inventors: Yukio Sakaguchi, Nara (JP); Akihisa Adachi, Kyoto (JP); Yuji Fujii, Nara (JP); Yuji Nakabayashi, Nara (JP); Hirokazu Gotou, Shiga (JP); Yasuharu Kawano, Nara (JP); Aoi Watanabe, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 112 days.

(21) Appl. No.: 14/410,397

(22) PCT Filed: Jun. 25, 2013

(86) PCT No.: PCT/JP2013/003970
§ 371 (c)(1),
(2) Date: Dec. 22, 2014

(87) PCT Pub. No.: WO2014/002486
PCT Pub. Date: Jan. 3, 2014

(65) Prior Publication Data
US 2015/0323364 A1    Nov. 12, 2015

(30) Foreign Application Priority Data

Jun. 28, 2012  (JP) .................................. 2012-145024

(51) Int. Cl.
*G01F 7/00* (2006.01)
*G01F 1/66* (2006.01)
(Continued)

(52) U.S. Cl.
CPC ............... *G01F 7/00* (2013.01); *G01F 1/66* (2013.01); *G01F 1/662* (2013.01); *G01F 3/22* (2013.01);
(Continued)

(58) Field of Classification Search
CPC ............... G01F 1/28; G01F 1/74; G01F 1/00
(Continued)

(56) References Cited

U.S. PATENT DOCUMENTS 5,861,556 A * 1/1999 Nukui .................... G01F 1/3209
73/204.17
2009/0099667 A1* 4/2009 Sekiai ..................... F01K 13/02
700/44
(Continued)

FOREIGN PATENT DOCUMENTS

EP    2 383 513 A1    11/2011
JP    8-320244 A    12/1996
(Continued)

OTHER PUBLICATIONS

Matsushita, Device for measuring quantity of flow, JP 2000146662, May 26, 2000.*
(Continued)

*Primary Examiner* — Michael A Lyons
*Assistant Examiner* — Nigel Plumb
(74) *Attorney, Agent, or Firm* — Brinks Gilson & Lione (57) ABSTRACT

A gas meter device of the present invention includes an inlet into which a fluid flows, and an outlet from which the fluid flows out, and is configured to derive a flow value of the fluid flowing from the inlet to the outlet. The gas meter device comprises plural measurement fluid passages provided in parallel between the inlet and the outlet; flow value measuring units provided in the plural measurement fluid passages, respectively, and configured to independently (Continued)

measure flow values of fluids flowing through the measurement fluid passages, respectively; an average flow value calculation unit configured to derive an average flow value of the flow values measured by the flow value measuring units, respectively; and a flow value comparison unit configured to obtain index values indicating a relation between the average flow value derived by the average flow value calculation unit and the flow values measured by the flow value measuring units, and determine whether or not each of the index values is equal to or larger than a predetermined value. Thereby, the present invention can determine whether or not there is an erroneous measurement flow value from only the separate flow values independently measured in the measurement fluid passages, respectively.

5 Claims, 4 Drawing Sheets

(51) Int. Cl.
    *G01F 3/22*         (2006.01)
    *G01F 5/00*         (2006.01)
    *G01F 15/04*       (2006.01)
    *G01F 15/07*       (2006.01)

(52) U.S. Cl.
    CPC ................ *G01F 5/00* (2013.01); *G01F 15/04* (2013.01); *G01F 15/07* (2013.01)

(58) Field of Classification Search
    USPC .......................................... 73/196, 195, 861
    See application file for complete search history.

(56) References Cited

U.S. PATENT DOCUMENTS

| | | | |
|---|---|---|---|
| 2009/0248213 A1 | 10/2009 | Gotoh | |
| 2009/0271128 A1* | 10/2009 | Umekage | .................. G01F 1/00 702/45 |

FOREIGN PATENT DOCUMENTS

| | | |
|---|---|---|
| JP | 11-287676 A | 10/1999 |
| JP | 2000-146662 A | 5/2000 |
| JP | 2009-245132 A | 10/2009 |

OTHER PUBLICATIONS

International Search Report in corresponding International Application No. PCT/JP2013/003970, dated Sep. 10, 2013, 1 page.
Extended European Search Report in corresponding European Application No. 13810625.7, dated Jun. 10, 2015, 7 pages.
Office Action and English language translation of Search Report, in corresponding Chinese Application No. 201380034305.8, dated Jan. 9, 2017, 10 pages.

* cited by examiner

| Measurement fluid passage | Flow value |
|---|---|
| Measurement fluid passage 22a | Qa |
| Measurement fluid passage 22b | Qb |
| Measurement fluid passage 22c | Qc |
| Measurement fluid passage 22d | Qd |
| Measurement fluid passage 22e | Qe |

71: Flow value data table

FLUID METER DEVICE

This application is a 371 application of PCT/JP2013/003970 having an international filing date of Jun. 25, 2013, which claims priority to JP 2012-145024 filed Jun. 28, 2012, the entire contents of which are incorporated herein by reference.

TECHNICAL FIELD

The present invention relates to a fluid meter device which measures the flow velocity of a fluid flowing through a fluid passage, and calculates the volumetric flow (flow rate) value of the fluid based on the flow velocity, to derive the usage amount of the fluid.

BACKGROUND ART

In these days, general gas customer houses are attached with membrane gas meters, each of which measures a gas flow value based on the number of times the gas flows through a measuring chamber. Since the membrane gas meter requires a space used to provide therein the measuring chamber of a relatively large volume, in a measurement principle, it is difficult to further reduce the size of the membrane gas meter.

Under the circumstances, in recent years, to realize a small-sized gas meter, an ultrasonic gas meter has been developed. The ultrasonic gas meter includes ultrasonic sensors (transduces or transmitters/receivers) which are attached to the upstream and downstream sides of a fluid passage through which the gas flows, and is configured to measure the flow velocity of the gas flowing through the fluid passage based on the arrival time of an ultrasonic wave, and calculate the volumetric flow value of the gas based on the flow velocity of the gas, thereby deriving the usage amount of the gas. As should be understood, the ultrasonic gas meter is capable of measuring the usage amount of the gas so long as there is provided a fluid passage for measuring the flow value. Therefore, it is easy to reduce the size of the ultrasonic gas meter.

Also, there is a need for development of a gas meter which is capable of measuring the usage amount of the gas for facility such as a factory which consumes a gas of a large amount, instead of the general gas customer houses. As an example of such a gas meter which is capable of measuring a large gas usage amount, there is proposed a fluid meter device configured in such a manner that plural measurement fluid passages connected to each other in parallel are provided, a pair of ultrasonic sensors are provided in each of the measurement fluid passages, the flow values in separate measurement fluid passages are measured, and a total flow value of these flow values is decided as the flow value of the whole fluid meter device (see Patent Literature 1).

However, in the fluid meter device configured in such a manner that a pair of ultrasonic sensors are provided for each of the plural measurement fluid passages, and the flow values in the separate measurement fluid passages are measured to derive the total flow value, if an abnormality occurs in any one of the measurement fluid passages, and this measurement fluid passage cannot measure the flow value correctly, then the total flow value cannot be derived correctly.

Under the circumstances, there is proposed a fluid meter device which includes flow value measuring units for independently measuring the flow values in plural measurement fluid passages, and a total flow value measuring unit for measuring the total flow value of the fluid flowing through the plural measurement fluid passages, and is configured to identify the measurement fluid passage in which there is an abnormality, based on a difference between the total flow value and the flow values of the separate measurement fluid passages (e.g., Patent Literature 2).

CITATION LIST

Patent Literature

Patent Literature 1: Japanese Laid-Open Patent Application Publication No. Hei 11-287676
Patent Literature 2: Japanese Patent No. 4174878 specification

SUMMARY OF THE INVENTION

Technical Problem

However, the above described prior art has a problem that it cannot identify the measurement fluid passage in which there is an abnormality, based on only the flow values independently measured in the plural measurement fluid passages. In other words, to identify the measurement fluid passage in which there is an abnormality, in the fluid meter device disclosed in Patent Literature 2, the fluid meter device is required to further include the total flow value measuring unit for measuring the total flow value of the fluid.

To allow the fluid of a large amount to flow through a single fluid passage, it is necessary to prepare a fluid passage with a large diameter (cross-sectional area). In a case where a pair of ultrasonic sensors measure the flow value of the fluid of a large amount, the pair of ultrasonic sensors are provided in the fluid passage with a large diameter, which increases a distance between the ultrasonic sensors. Therefore, the pair of ultrasonic sensors may be able to suitably transmit and receive the ultrasonic wave by, for example, increasing the sound pressure level of the ultrasonic wave to be generated. However, this is costly.

The present invention has been made in view of the above described problem, and an object of the present invention is to provide a fluid meter device which is capable of determining whether or not there is an erroneously measured flow value (erroneous measurement flow value), based on only the separate flow values independently measured in the plural measurement fluid passages, respectively.

Solution to Problem

To achieve the above described object, according to an aspect of the present invention, there is provided a fluid meter device including an inlet into which a fluid flows, and an outlet from which the fluid flows out, and being configured to derive a flow value of the fluid flowing from the inlet to the outlet, the fluid meter device comprising: plural measurement fluid passages provided in parallel between the inlet and the outlet; separate flow value measuring units provided in the plural measurement fluid passages, respectively, and configured to independently measure separate flow values of fluids flowing through the measurement fluid passages, respectively; an average flow value calculation unit configured to derive an average flow value of the separate flow values measured by the separate flow value measuring units, respectively; and a comparison/determination unit configured to compare the average flow value derived by the average flow value calculation unit to the separate flow values measured by the separate flow value measuring units, and determine whether or not each of difference values with respect to reference values is equal to or larger than a predetermined value.

Advantageous Effects of Invention

The present invention is configured as described above, and has an advantage that it can be determined whether or not there is an abnormality in plural measurement fluid passages without measuring a total flow value.

DETAILED DESCRIPTION OF THE PREFERRED EMBODIMENTS

According to a first aspect of the present invention, there is provided a fluid meter device including an inlet into which a fluid flows, and an outlet from which the fluid flows out, and being configured to derive a flow value of the fluid flowing from the inlet to the outlet, the fluid meter device comprising: plural measurement fluid passages provided in parallel between the inlet and the outlet; separate flow value measuring units provided in the plural measurement fluid passages, respectively, and configured to independently measure separate flow values of fluids flowing through the measurement fluid passages, respectively; an average flow value calculation unit configured to derive an average flow value of the separate flow values measured by the separate flow value measuring units, respectively; and a comparison/determination unit configured to obtain index values indicating a relation between the average flow value derived by the average flow value calculation unit and the separate flow values measured by the separate flow value measuring units, and determine whether or not each of the index values is equal to or larger than a predetermined value.

In accordance with this configuration, since the fluid meter device includes the separate flow value measuring units and the average flow value calculation unit, the average flow value can be derived from the separate flow values which are the flow values independently measured in the measurement fluid passages, respectively.

The average flow value changes depending on the flow value of the fluid flowing through the fluid meter device. However, the average flow value indicates a fixed relation in comparison with the separate flow values of the measurement fluid passages provided in parallel.

For example, in a case where the measurement fluid passages provided in parallel have a substantially equal dimension, the average flow value of the separate flow values is substantially equal to the separate flow values of the fluids flowing through the measurement fluid passages, respectively. In this relation, as the index values, the difference values between the average flow value and the separate flow values can be utilized.

For example, in a case where the index values are the difference values between the average flow value and the separate flow values, the index value of the separate flow value which is correctly obtained is zero or a value which is approximate to zero (value which is close to zero as a reference value).

Even in a case where the measurement fluid passages provided in parallel are different from each other in dimension, the relation between the average flow value of the separate flow values measured in the measurement fluid passages and the separate flow values of the measurement fluid passages, respectively, is substantially fixed. In this relation, for example, in a case where the index values are the ratio values between the average flow value and the separate flow values, the index value of the separate flow value which is correctly obtained coincides with the ratio value or a value which is approximate to the ratio value.

Conversely, in a case where the index value derived from the average flow value and the separate flow value of the measurement fluid passage is equal to or larger than the predetermined value, it may be estimated that this separate flow value is an erroneously measured flow value (erroneous measurement flow value).

The predetermined value may be deemed as a value which is a range of non-uniformity of the index values which can be deemed as normal separate flow values, and set in view of, for example, design errors in the measurement fluid passages, measuring errors of the flow values in the measurement fluid passages, etc. By setting the predetermined value in this way, only the erroneous measurement flow value can be identified.

Therefore, as described above, since the fluid meter device the first aspect of the present invention includes the comparison/determination unit, which can determine whether or not each of the index values indicating a relation between the average flow value and the separate flow values of the fluid passages is equal to or larger than the predetermined value, it can be determined whether or not the separate flow value is the erroneous measurement flow value.

Therefore, the fluid meter device of the present invention has an advantage that it can be determined whether or not there is an erroneous measurement flow value by using only the separate flow values independently measured in the measurement fluid passages.

According to a second aspect of the present invention, the fluid meter device according to the first aspect may comprise a total flow value calculation unit configured to derive the flow value of the fluid flowing from the inlet to the outlet, based on the separate flow values which are other than the separate flow value as to which the comparison/determination unit determines that the index value is equal to or larger than the predetermined value.

In accordance with this configuration, since the fluid meter device includes the total flow value calculation unit, the total flow value of the fluid flowing from the inlet to the outlet can be derived from the separate flow values which are other than (except for) the separate flow value as to which the comparison/determination unit determines that the corresponding index value is equal to or larger than the predetermined value.

According to a third aspect of the present invention, in the fluid meter device according to the first or second aspect, the comparison/determination unit may derive as the index values difference values between the average flow value and the separate flow values, and determine whether or not each of the difference values is equal to or larger than the predetermined value.

The difference values between the average flow value and the separate flow values can be derived as absolute values obtained by subtracting the separate flow values from the average flow value.

According to a fourth aspect of the present invention, in the fluid meter device according to the first or second aspect, the comparison/determination unit may derive as the index values ratio values between the average flow value and the separate flow values, and may determine whether or not each of the ratio value is equal to or larger than the predetermined value.

According to a fifth aspect of the present invention, in the fluid meter device according to the third or fourth aspect, the predetermined value may be set based on the average flow value derived by the average flow value calculation unit.

According to a sixth aspect of the present invention, in the fluid meter device according to any one of the first to fifth aspects, the average flow value calculation unit may derive the average flow value, from the separate flow values of the measurement fluid passages which are measured by the flow value measuring units, except for a largest flow value and a smallest flow value.

In accordance with this configuration, the average flow value is derived, from the separate flow values which are other than the largest flow value and the smallest flow value. In a case where the separate flow values measured in the measurement fluid passages include the erroneous measurement flow values, the largest flow value and the smallest flow value are the erroneous measurement flow values. Therefore, the average flow value calculation unit can derive the average flow value by using the separate flow values which are other than the erroneous measurement flow values. As a result, the average flow value can be obtained more correctly.

Hereinafter, preferred embodiments of the present invention will be described with reference to the drawings. Throughout the drawings, the same or corresponding components are designated by the same reference symbols, and will not be described repeatedly.

(Gas Meter Device)

Figure 1:
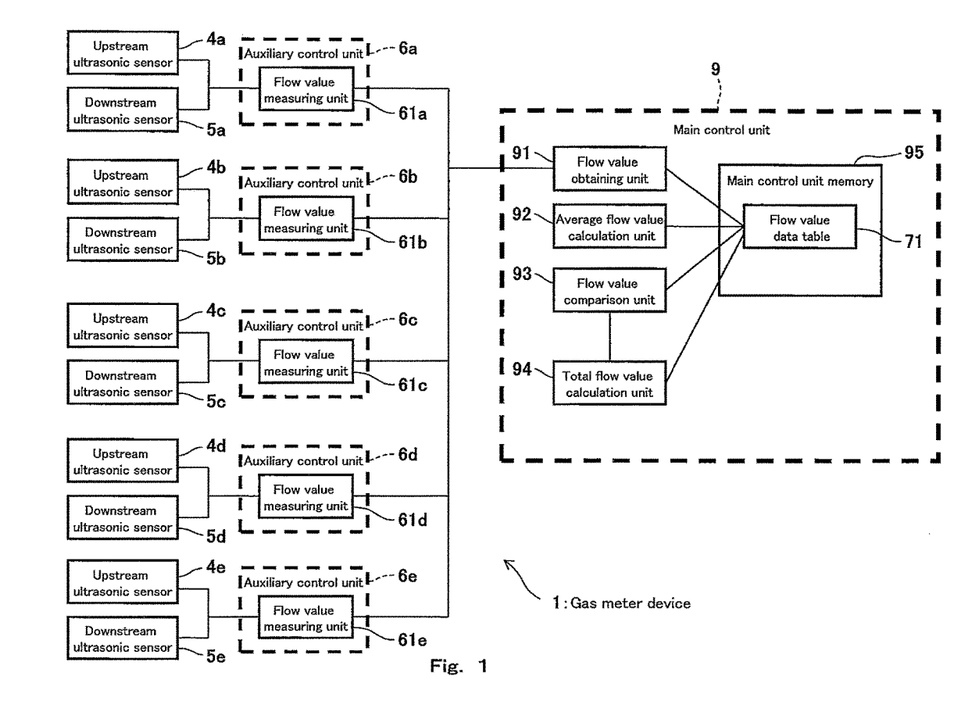
FIG. 1 is a block diagram showing the configuration associated with a flow value measuring process in a gas meter device according to the present embodiment.
Figure 2:
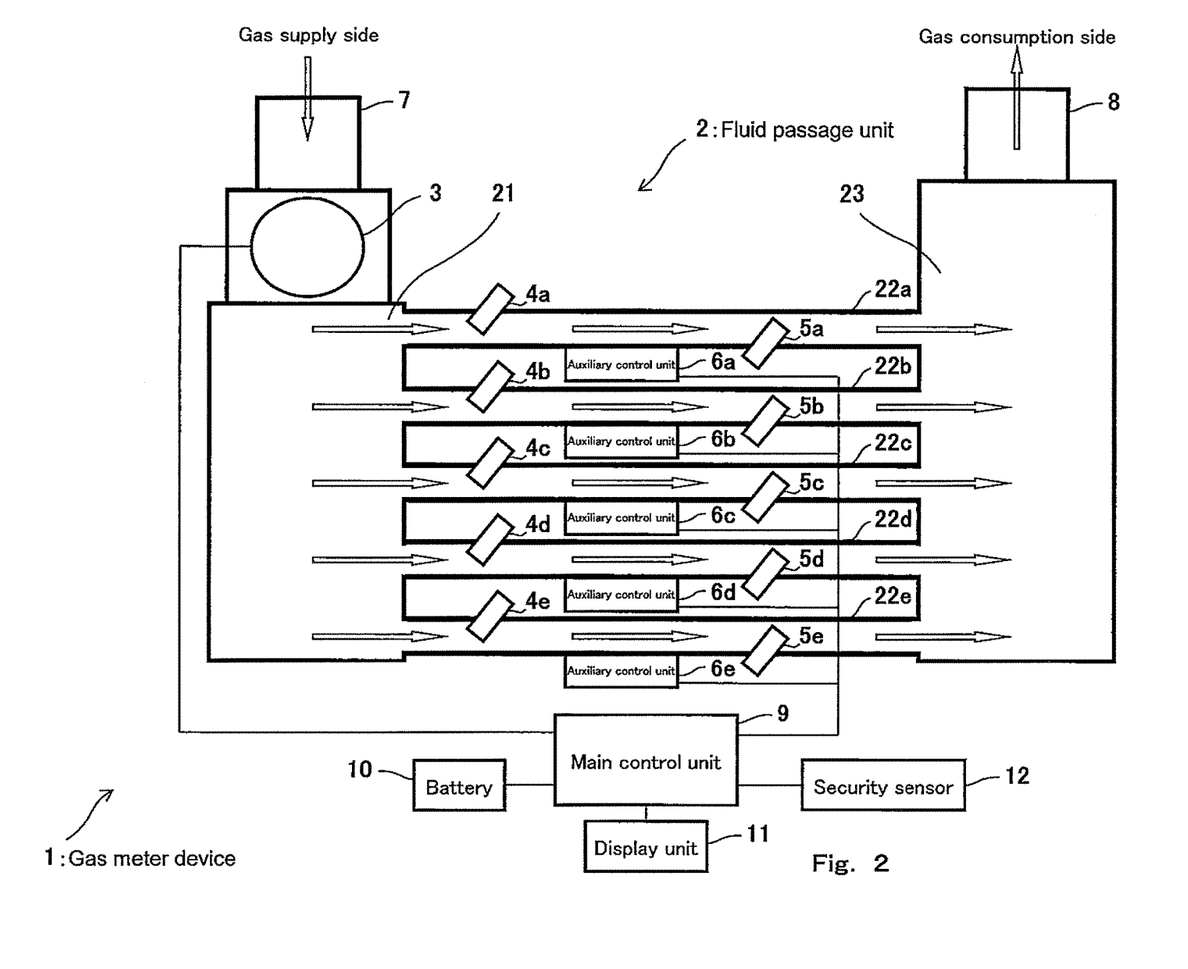
FIG. 2 is a schematic view showing the major components of the gas meter device according to the present embodiment.

First of all, the configuration of a gas meter device (fluid meter device) 1 according to the present embodiment will be described with reference to FIGS. 1 and 2. FIG. 1 is a block diagram showing the configuration associated with a flow value measuring process in the gas meter device 1 according to the present embodiment. FIG. 2 is a schematic view showing the major components of the gas meter device 1 according to the present embodiment.

The gas meter device 1 according to the present embodiment is an ultrasonic gas meter which is installed in the intermediate portion of a gas pipe and derives a consumed gas flow value (gas usage amount). Note that the gas meter device 1 is not limited to the ultrasonic gas meter. For example, the gas meter device 1 may be configured to derive the gas flow value by using a flow sensor utilizing an electronic detection principle, or an instantaneous flow meter such as a fluidic flow meter.

As shown in FIGS. 1 and 2, the gas meter device 1 includes a fluid passage unit 2, upstream ultrasonic sensors 4a to 4e, downstream ultrasonic sensors 5a to 5e, auxiliary control units 6a to 6e, an inlet 7, an outlet 8, a main control unit 9, a battery 10, a display unit 11, and a security sensor 12. Here, it is supposed that the gas flows in one direction inside the fluid passage unit 2 from the inlet 7 toward the outlet 8.

The inlet 7 is an entrance through which the gas supplied from a gas pipe at a supply side (gas supply pipe) flows into the gas meter device 1. In the gas meter device 1 according to the present embodiment, the inlet 7 is provided on the upper surface thereof to connect the gas supply pipe to the fluid passage unit 2.

The outlet 8 is an exit through which the gas flows out of the gas meter device 1 to a gas pipe at a consumption side (gas consumption pipe). In the gas meter device 1 according to the present embodiment, the outlet 8 is provided on the upper surface thereof to connect the gas consumption pipe the fluid passage unit 2.

The fluid passage unit 2 is a tubular pipe which has a rectangular cross-section and through which the gas flows to be supplied to a customer. As shown in FIG. 1, the fluid passage unit 2 includes a shut-off valve 3, an inlet buffer 21, plural measurement fluid passages 22a to 22e, and an outlet buffer 23.

The measurement fluid passages 22a to 22e are fluid passages configured to measure the flow values (flow value of the gas flowing through the gas meter device 1) of the gas consumed. In the present embodiment, the measurement fluid passages 22a to 22e are configured to have an equal diameter (cross-sectional area). In a case where it is not necessary to explain the measurement fluid passages 22a to 22e in such a way that they are differentiated from each other, description will be given using the term "measurement fluid passage 22."

The fluid passage unit 2 includes the inlet buffer 21 in a position which is upstream of the plural measurement fluid passages 22a to 22e, and the outlet buffer 23 in a position which is downstream of the plural measurement fluid passages 22a to 22e. The inlet buffer 21, the measurement fluid passages 22a to 22e, and the outlet buffer 23 communicate with each other. In the gas meter device 1 of the present embodiment, the measurement fluid passages 22a to 22e are configured to independently measure the flow values of the gas flowing between the inlet buffer 21 and the outlet buffer 23, respectively. In other words, in the gas meter device 1 of the present embodiment, all of the fluid passages (measurement fluid passages 22a to 22e) arranged in parallel between the inlet buffer 21 and the outlet buffer 23 are configured to independently measure the flow values (separate flow values) of the gas flowing through the measurement fluid passages 22a to 22e, respectively.

The gas meter device 1 of the present embodiment includes the shut-off valve 3 in a position which is upstream of the fluid passage unit 2 (upstream of the inlet buffer 21). The shut-off valve 3 is configured to close the fluid passages of the fluid passage unit 2, for example, in a case where an abnormality such as a gas leakage in a region from the gas meter device 1 to gas equipment (not shown) placed at the gas consumption side, is detected, in response to a request for shutting-off the fluid passage unit 2 from outside, or for other reason, to shut-off the gas flow. The shut-off valve 3 is capable of closing or opening the fluid passage between the inlet 7 and the inlet buffer 21, in response to a control command from the main control unit 9. The shut-off valve 3 is configured to include a valve disc (valve plug) (not shown) for closing the fluid passage of the fluid passage unit 2 and a stepping motor (not shown) which is a power source of the valve disc. More specifically, the shut-off valve 3 closes or opens the fluid passage of the fluid passage unit 2 as will be described below.

Specifically, in response to the control command output from the main control unit 9, a pulse current having a phase difference is applied to coils (not shown) of a stator of the stepping motor of the shut-off valve 3. By the application of this current, the rotor (not shown) of the stepping motor is rotated in a forward direction. According to the forward rotation of the rotor, the valve disc advances toward a valve seat (not shown) and closes the fluid passage. In this way, the gas flow is shut-off in the gas meter device 1. Conversely, in a case where the fluid passage is opened, the stepping motor of the shut-off valve 3 is rotated in a reverse direction, and thereby the valve disc is moved away from the valve seat.

The upstream ultrasonic sensors 4a to 4e and the downstream ultrasonic sensors 5a to 5e mutually transmit and receive the ultrasonic wave. The upstream ultrasonic sensors 4a to 4e are provided in the measurement fluid passages 22a to 22e, respectively, and the downstream ultrasonic sensors 5a to 5e are provided in the measurement fluid passages 22a to 22e, respectively. In a case where it is not necessary to explain the upstream ultrasonic sensors 4a to 4e in such a way that they are differentiated from each other, description will be given using the term "upstream ultrasonic sensor(s) 4." In the same manner, in a case where it is not necessary to explain the downstream ultrasonic sensors 5a to 5e in such a way that they are differentiated from each other, description will be given using the term "downstream ultrasonic sensor(s) 5."

Pairs of the upstream ultrasonic sensors 4 and the downstream ultrasonic sensors 5 are configured to be activated in response to control commands output from the auxiliary control units 6a to 6e provided to correspond to the measurement fluid passages 22, respectively. In a case where it is not necessary to explain the auxiliary control units 6a to 6e in such a way that they are differentiated from each other, description will be given using the term "auxiliary control unit(s) 6."

Each of the upstream ultrasonic sensors 4 is attached to the upstream side wall of the corresponding measurement fluid passage 22, and each of the downstream ultrasonic sensors 5 is attached to the downstream side wall of the corresponding measurement fluid passage 22 such that the upstream ultrasonic sensor 4 and the downstream ultrasonic sensor 5 face each other. When the upstream ultrasonic sensor 4 receives an activation signal (control signal) from the main control unit 9 via the auxiliary control unit 6, the upstream ultrasonic sensor 4 outputs an ultrasonic wave toward the downstream ultrasonic sensor 5. The ultrasonic wave output from the upstream ultrasonic sensor 4 travels in an obliquely downward direction toward a downstream side inside the measurement fluid passage 22, and propagates toward the downstream ultrasonic sensor 5. On the other hand, when the downstream ultrasonic sensor 5 receives the activation signal from the main control unit 9 via the auxiliary control unit 6, the downstream ultrasonic sensor 5 outputs the ultrasonic wave toward the upstream ultrasonic sensor 4. The ultrasonic wave output from the downstream ultrasonic sensor 5 travels in an obliquely upward direction toward an upstream side inside the measurement fluid passage 22, and propagates toward the upstream ultrasonic sensor 4. The auxiliary control unit 6 measures the arrival times of these ultrasonic waves, and calculates the flow velocity of the gas flowing through the fluid passage unit 2 based on a difference between the arrival times. Then, the auxiliary control unit 6 derives the flow value by multiplying the flow velocity by the cross-sectional area of the fluid passage unit 2, or the like. After the auxiliary control unit 6 derives the gas flow value, it notifies the main control unit 9 of the gas flow value.

The main control unit 9 is configured to control the operations of the respective sections of the gas meter device 1, and operate as follows, for example, as "control processes of the respective sections." Specifically, the gas meter device 1 includes the security sensor 12 for detecting whether or not there is an abnormality such as a gas leakage in a location which is downstream of the gas meter device 1. The main control unit 9 is configured to determine whether or not there is an abnormality such as a gas leakage from the result of detection performed by the security sensor 12, or determine whether or not there is a shut-off command for closing the measurement fluid passage, which is received from outside. When the main control unit 9 determines that there is an abnormality such as a gas leakage, or it receives the shut-off command, it applies a current to the shut-off valve 3 to close the fluid passage of the fluid passage unit 2, as described above. Or, the main control unit 9 is configured to cause the display unit 11 to display various information such as the flow value of a consumed gas. The display unit 11 can be realized by, for example, a CRT, a liquid crystal display, a plasma display, or an organic EL display.

Or, the main control unit 9 may be configured to perform the "gas flow value measuring process" as follows. The main control unit 9 determines whether or not a measurement fluid passage 22 having an erroneous measurement flow value, exists, based on the gas flow received from each of the auxiliary control units 6. When the main control unit 9 determines that the measurement fluid passage 22 having the erroneous measurement flow value exists, it can derive a total flow value from measurement flow values which are other than (except for) the erroneous measurement flow value of this measurement fluid passage 22. The "gas flow value measuring process" of the gas meter device 1 of the present embodiment will be described in detail later.

The auxiliary control unit 6 can be realized by, for example, LSI (large scale integration) for ultrasonic wave measurement. This ultrasonic wave measurement LSI includes an analog circuit which is capable of measuring the ultrasonic wave and a digital circuit which sequentially performs the operation for measuring transit time (propagation time) of the ultrasonic wave. In contrast, the main control unit 9 can be realized by, for example, CPU.

(Configuration Associated with Gas Flow Value Measuring Process)

Hereinafter, the configuration associated with the "gas flow value measuring process" of the gas meter device 1 of the present embodiment will be described more specifically with reference to FIG. 1.

As shown in FIG. 1, the auxiliary control units 6a to 6e include flow value measuring units (separate flow value measuring unit) 61a to 61e, respectively, as the configuration associated with the "gas flow value measuring process". In a case where it is not necessary to explain the flow value measuring units 61a to 61e in such a way that they are differentiated from each other, description will be given using the term "flow value measuring unit(s) 61."

Each of the flow value measuring units 61 calculates the flow velocity of the gas flowing through the measurement fluid passage 22 based on the above described difference between the arrival times of the ultrasonic waves, which are obtained by using the upstream ultrasonic sensor 4 and the downstream ultrasonic sensor 5, and then calculates the flow value per unit of time, of the gas which has flowed through the measurement fluid passage 2 based on the flow velocity, the cross-sectional area of the measurement fluid passage 22, or the like. The upstream ultrasonic sensor 4, the downstream ultrasonic sensor 5, and the flow value measuring unit 61 implement a separate flow value measuring unit of the present invention.

In the present embodiment, the gas meter device 1 is configured in such a manner that the upstream ultrasonic sensor 4 and the downstream ultrasonic sensor 5 mutually transmit and receive the ultrasonic wave plural times, once in every 2 seconds. Therefore, the gas meter device 1 of the present embodiment is configured to check a change in the gas flow once in every 2 seconds.

The main control unit 9 includes as the configuration associated with the "gas flow value measuring process", a flow value obtaining unit 91, an average flow value calculation unit 92, a flow value comparison unit (comparison/determination unit) 93, a total flow value calculation unit 94, and a main control unit memory 95.

Figure 3:
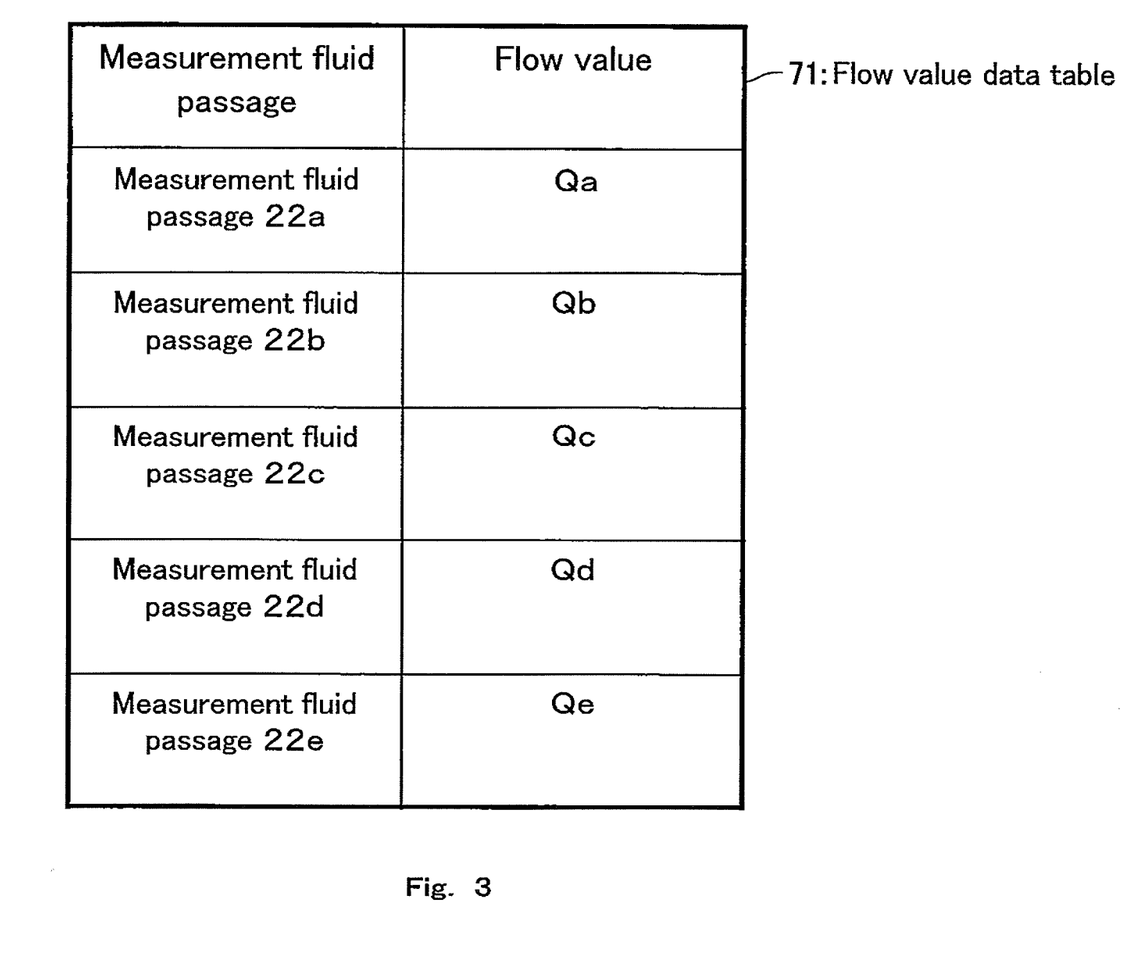
FIG. 3 is a view showing an example of a flow value data table stored in a main control unit memory, in the gas meter device according to the present embodiment.

The flow value obtaining unit 91 is configured to receive the gas flow value measured in each measurement fluid passage 22, and store the gas flow value in the main control unit memory 95, as a flow value data table 71. For example, as shown in FIG. 3, the flow value data table 71 contains the gas flow values measured in the measurement fluid passages 22 such that the gas flow values correspond to the measurement fluid passages 22, respectively. FIG. 3 is a view showing an example of the flow value data table 71 stored in the main control unit memory 95, in the gas meter device 1 according to the present embodiment.

Now it is supposed that the flow value of the gas which has flowed through the measurement fluid passage 22a is, for example, Qa. In this case, this flow value Qa is stored in the flow value data table 71 such that Qa corresponds to the measurement fluid passage 22a. In the same manner, the gas flow values Qb to Qe measured in the measurement fluid passages 22b to 22e are stored in the flow value data table 71 such that the gas flow values Qb to Qe correspond to the measurement fluid passages 22b to 22e, respectively.

The main control unit memory 95 can be realized by a semiconductor memory device such as a RAM or an EEPROM which is able to write and read data.

The average flow value calculation unit 92 calculates the average flow value of the flow values Qa to Qe measured in the measurement fluid passages 22a to 22e with reference to the flow value data table 71 stored in the main control unit memory 95. The measurement fluid passages 22a to 22e are arranged in parallel, and have an equal diameter (cross-sectional area). Therefore, in principle, the flow values Qa to Qe measured in the measurement fluid passages 22a to 22e are substantially equal. However, in some cases, an abnormality occurs in the operation of any of the upstream ultrasonic sensor 4, the downstream ultrasonic sensor 5, and the auxiliary control unit 6, which are provided in the measurement fluid passage 22, and as a result a correct flow value cannot be measured, i.e., an erroneous measurement flow value is obtained.

To solve the above problem, the average flow value calculation unit 92 obtains the average flow value by summing up the flow values which are other than (except for) a largest value and a smallest value, among the measured flow values Qa to Qe, to exclude flow values which are an extremely large or small value such as the above erroneous measurement flow values, among the measured flow values Qa to Qe, thereby obtaining the average flow value. Then, the average flow value calculation unit 92 outputs the average flow value to the flow value comparison unit 93.

The flow value comparison unit 93 is configured to derive index values indicating the relationship between the average flow value calculated by the average flow value calculation unit 92, and the flow values of the measurement fluid passages 22 which are measured by the flow value measuring units 61, and determines whether or not each of the index values is equal to or larger than a predetermined value. More specifically, the flow value comparison unit 93 calculates as the index values, difference values between the average flow value calculated by the average flow value calculation unit 92 and flow value data stored as the flow value data table 71 in the main control unit memory 95. Then, the flow value comparison unit 93 determines whether or not each of the difference values (index values) is equal to or larger than the predetermined value. When the flow value comparison unit 93 determines that the index value is equal to or larger than the predetermined value, then it determines that the corresponding flow value results from erroneous measurement. On the other hand, when the flow value comparison unit 93 determines that the index value is smaller than the predetermined value, then it determines that the corresponding flow value does not result from the erroneous measurement.

In the present embodiment, in principle, the measurement fluid passages 22a to 22e have an equal dimension. Therefore, in a case where the flow value of the gas flowing through the measurement fluid passage 22 is measured correctly, the index value obtained from this flow value and the average flow value coincides with 0 or falls within a range from 0 to the predetermined value. This predetermined value is preferably set in view of non-uniformity of the actual flow values of the measurement fluid passages 22a to 22e, which is attributed to manufacturing errors of the measurement fluid passages 22a to 22e, measurement flow value errors which are associated with the upstream ultrasonic sensors 4, the downstream ultrasonic sensors 5, and the auxiliary control units 6, etc.

The total flow value calculation unit 94 is configured to calculate the total flow value of the gas flowing through the gas meter device 1 based on the result of the comparison performed by the flow value comparison unit 93. In the gas meter device 1 of the present embodiment, all of the measurement fluid passages arranged in parallel between the inlet buffer 21 and the outlet buffer 23 are configured to measure the gas flow values, respectively.

In this configuration, when the flow value comparison unit 93 determines that the measurement fluid passage having the erroneous measurement flow value does not exist, the total flow value calculation unit 94 derives the total flow value by summing up the gas flow values of the measurement fluid passages 22a to 22e.

On the other hand, when the flow value comparison unit 93 determines that the measurement fluid passage having the erroneous measurement flow value exists, the total flow value calculation unit 94 does not use the measurement flow value of the measurement fluid passage 22 which is determined as having the erroneous measurement flow value. Instead of the erroneous measurement flow value, the total flow value calculation unit 94 uses the average flow value having already been calculated by the average flow value calculation unit 92, because the measurement fluid passages 22a to 22e have an equal cross-sectional area.

(Process Flow of Gas Flow Value Measuring Process)

Figure 4:
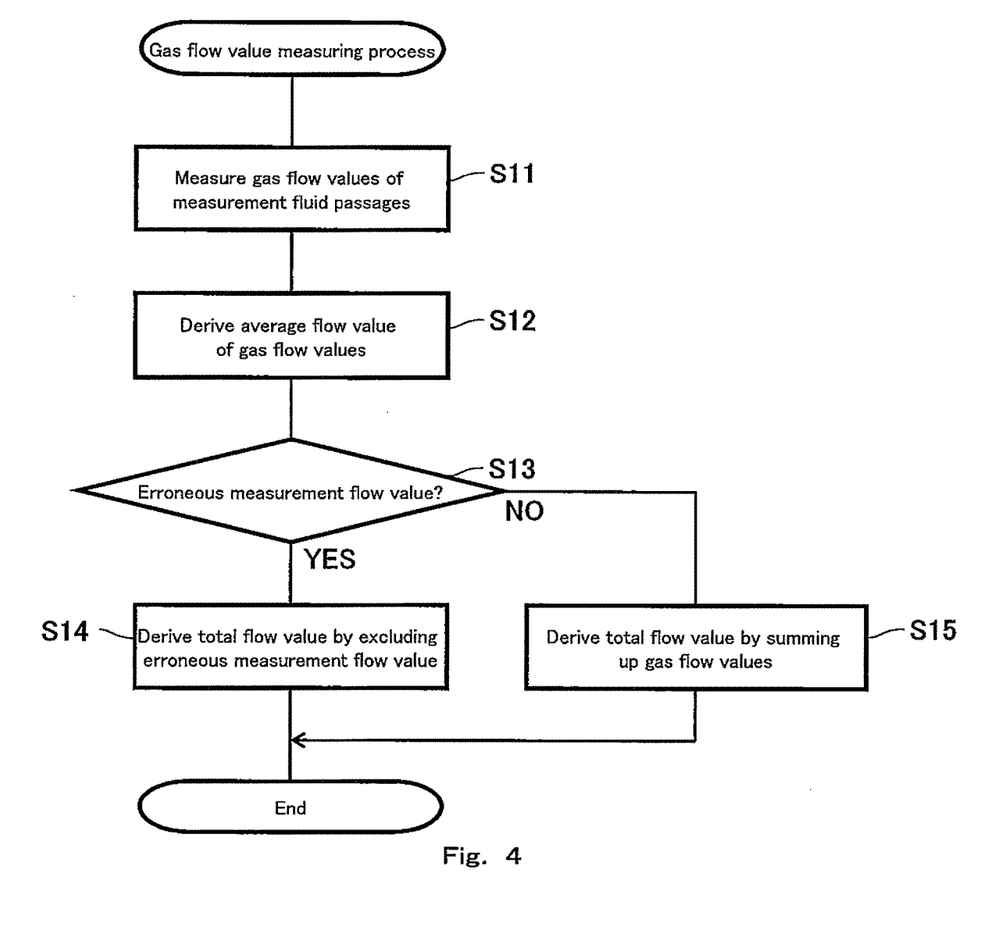
FIG. 4 is a flowchart showing an example of the process flow of the gas flow value measuring process in the gas meter device according to the present embodiment.

Next, the exemplary process flow of the "gas flow value measuring process" of the gas meter device 1 configured as described above will be described with reference to FIG. 4. FIG. 4 is a flowchart showing an example of the process flow of the gas flow value measuring process in the gas meter device 1 according to the present embodiment.

First of all, a gas consumption device or the like connected to the gas meter device 1 starts to consume the gas. At this time, the measurement fluid passages of the fluid passage unit 2 are opened by the shut-off valve 3.

When the gas consumption device or the like starts to consume the gas, the gas flowing into the gas meter device 1 through the inlet 7 is divided to flow into the measurement fluid passages 22*a* to 22*e* through the inlet buffer 21, and then toward the outlet buffer 23. In the auxiliary control units 6*a* to 6*e*, the flow value measuring units 61*a* to 61*e* calculate the flow velocities of the gas flowing through the measurement fluid passages 22*a* to 22*e*, respectively, based on the differences of the arrival times of the ultrasonic waves which are measured by the upstream ultrasonic sensors 4*a* to 4*e* and the downstream ultrasonic sensors 5*a* to 5*e*. From the flow velocities, the auxiliary control units 6*a* to 6*e* calculate the gas flow values of the measurement fluid passages 22*a* to 22*e*, respectively (step S11). Then, the auxiliary control units 6*a* to 6*e* send to the main control unit 9 the calculated gas flow values of the measurement fluid passages 22*a* to 22*e*.

In the main control unit 9, the flow value obtaining unit 91 receives the gas flow values of the measurement fluid passages 22*a* to 22*e*, and stores these gas flow values in the main control unit memory 95 as the flow value data table 71. After the flow value data table 71 is stored in the main control unit memory 95, the average flow value calculation unit 92 calculates the average flow value of the gas flow values of the measurement fluid passages 22*a* to 22*e*, with reference to the flow value data table 71 (step S12). The average flow value calculation unit 92 calculates the average flow value of the gas flow values in such a way that it excludes a largest flow value and a smallest flow value, from the flow values stored in the flow value data table 71.

After the average flow value calculation unit 92 of the main control unit 9 calculates the average flow value of the measured flow values, the flow value comparison unit 93 obtains the index values based on this average flow value and the gas flow values of the measurement fluid passages 22*a* to 22*e*, and determines whether or not there is an erroneous measurement flow value, depending on whether or not each of the index values is equal to or larger than the predetermined value (step S13). Specifically, the flow value comparison unit 93 calculates the difference values between the average flow value calculated by the average flow value calculation unit 92 and the gas flow values Qa to Qe measured in the measurement fluid passages 22*a* to 22*e*, with reference to the flow value data table 71, and determines whether or not each of the difference values (index values) is equal to or larger than the predetermined value. When the flow value comparison unit 93 determines that the flow value corresponding to the index value which is equal to or larger than the predetermined value exists, it determines that this flow value is the erroneous measurement flow value ("YES" in step S13). On the other hand, when the flow value comparison unit 93 determines that each of the index values is smaller than the predetermined value, it determines that the erroneous measurement flow value does not exist ("NO" in step S13).

When the result of determination in step S13 is "YES", the total flow value calculation unit 94 derives the total flow value of the gas flowing through the gas meter device 1, by using the flow values which are other than the erroneous measurement flow value (step S14). Specifically, the total flow value calculation unit 94 sums up the flow values measured in the measurement fluid passages 22*a* to 22*e* without using the flow value of the measurement fluid passage 22 which is determined as having the erroneous measurement flow value, but instead using the average flow value having already been calculated.

On the other hand, when the result of determination in step S13 is "NO", the total flow value calculation unit 94 calculates the total flow value by summing up the flow values measured in the measurement fluid passages 22*a* to 22*e* (S15).

(Advantages)

As described above, in the gas meter device 1 of the present embodiment, since the main control unit 9 includes the flow value comparison unit 93, it can be determined whether or not the gas flow values of the measurement fluid passages 22*a* to 22*e* include the erroneous measurement flow value. In addition, since the main control unit 9 includes the total flow value calculation unit 94, the total flow of the gas flowing through the gas meter device 1 can be derived while excluding the erroneous measurement flow value even when the gas flow values of the measurement fluid passages 22*a* to 22*e* include the erroneous measurement flow value.

(Modified Example of Method of Comparison Performed by Flow Value Comparison Unit)

(Modified Example 1 of Comparison Method)

As described above, in the gas meter device 1 of the present embodiment, the flow value comparison unit 93 is configured to obtain as the index values the difference values between the average flow value derived from the flow values measured in the measurement fluid passages 22*a* to 22*e*, except for the largest flow value and the smallest flow value, and the flow values measured in the measurement fluid passages 22*a* to 22*e*, and determine whether or not each of these index values is equal to or larger than the predetermined value, thereby determining whether or not the measurement flow values include the erroneous measurement flow value. The predetermined value may be a fixed value or a value varying depending on the flow value of the gas flowing through the gas meter device 1, for example, the average flow value of the flow values measured in the measurement fluid passages 22*a* to 22*e*.

(Modified Example 2 of Comparison Method)

Although the measurement fluid passages 22*a* to 22*e* of the present embodiment have an equal diameter (cross-sectional area), this is merely exemplary. For example, the measurement fluid passages 22*a* to 22*e* may be different from each other in diameter (cross-sectional area). In a case where the measurement fluid passages 22*a* to 22*e* are different from each other in diameter (cross-sectional area), the flow value comparison unit 93 may derive the index values from the flow values measured by the measurement fluid passages 22*a* to 22*e*, and determine whether or not the measurement flow values include the erroneous measurement flow value, as will be described below.

Specifically, in the gas meter device 1 of the present embodiment, values having proper margins with respect to ratio values indicating the relation between the average flow value of the gas flow value corresponding to one measurement fluid passage 22 in a case where the gas is flowed through the measurement fluid passages 22 at a specified flow, and the gas flow values of the measurement fluid passages 22, are pre-stored as predetermined values, respectively (not shown).

For example, in a case where the average flow value of the gas flow values of the measurement fluid passages 22*a* to 22*e* is 100 L and the flow value of the gas which actually flows through the measurement fluid passage 22a is 10 L, the value having the proper margin with respect to the ratio value indicating the relation (10:1) between the average flow value and the actual flow value is stored as the predetermined value. The margins of the ratio values are preferably set in view of manufacturing errors of the measurement fluid passages 22a to 22e, measurement flow value errors which are associated with the upstream ultrasonic sensors 4, the downstream ultrasonic sensors 5, and the auxiliary control units 6, etc.

Then, in the actual flow value measurement, the flow value comparison unit 93 obtains as the index values, the ratio values indicating the relation between the average flow value of the flow values measured in the measurement fluid passages 22a to 22e, and the flow values measured in the measurement fluid passages 22a to 22e, respectively. Then, the flow value comparison unit 93 determines whether or not each of the index values thus obtained is equal to or larger than the predetermined value.

When the flow value comparison unit 93 determines that the index value is equal to or larger than the predetermined value, it determines that the flow value measured in the corresponding measurement fluid passage 22 is the erroneous measurement flow value.

(Modified Examples of Method of Total Flow Value Calculation Performed by Total Flow Value Calculation Unit)

(Modified Example 1 of Total Flow Value Calculation Method)

As described above, the total flow value calculation unit 94 included in the main control unit 9 of the gas meter device 1 of the present embodiment is configured to derive the total flow value of the gas flowing through the gas meter device 1, by summing up the flow values independently measured in the measurement fluid passages 22a to 22e. Also, in a case where the flow values measured in the measurement fluid passages 22a to 22e include the erroneous measurement flow value, the total flow value calculation unit 94 calculates the total flow value by using the average flow value of the flow values which are other than the erroneous measurement flow value, instead of the erroneous measurement flow value.

However, how to derive the total flow value is not limited to the above described method.

For example, the measurement fluid passages 22a to 22e of the present embodiment have an equal diameter (cross-sectional area). The total flow value calculation unit 94 calculates the average flow value of the flow values which are other than the erroneous measurement flow value. Then, the total flow value calculation unit 94 may obtain the total flow value by multiplying the average flow value by the number of measurement fluid passages 22. For example, in the present embodiment, as shown in FIG. 1, the number of the measurement fluid passages 22 is five. Therefore, as described above, the total flow value calculation unit 94 obtains the total flow value by multiplying the average flow value by five.

(Modified Example 2 of Total Flow Value Calculation Method)

As described above, the gas meter device 1 of the present embodiment is configured to measure the flow value of the gas flowing through each measurement fluid passage 22 once in every 2 seconds. A history of the measurement flow values is stored in the main control unit memory 95, as the flow value data table 71. When the measurement fluid passage 22 determined as having the erroneous measurement flow value exists, the total flow value calculation unit 94 may derive the total flow value using the flow value which was measured 2 seconds before (flow value which was determined as correct measurement flow value) the erroneous measurement flow value, in that measurement fluid passage 22, instead of the erroneous measurement flow value.

In other words, the total flow value calculation unit 94 derives the total flow value of the gas flowing through the gas meter device 1 by summing up the gas flow values which are determined as correct measurement flow values and the gas flow value which was measured 2 seconds before (i.e., flow value which was determined as correct measurement flow value) the erroneous measurement flow value, instead of the erroneous measurement flow value.

(Modified Example 3 of Total Flow Value Calculation Method)

Although the measurement fluid passages 22a to 22e of the present embodiment have an equal diameter (cross-sectional area), this is merely exemplary. For example, the measurement fluid passages 22a to 22e may be different from each other in diameter (cross-sectional area). In a case where the measurement fluid passages 22a to 22e are different from each other in diameter (cross-sectional area), the total flow value calculation unit 94 may derive the total flow value of the gas flowing through the gas meter device 1 as describe below.

Specifically, in advance, the gas of a predetermined total flow value is flowed in the gas meter device 1, and coefficient data indicating the relation between the predetermined total flow value and the gas flow values of the measurement fluid passages 22 are derived and stored in the main control unit memory 95 so as to correspond to the measurement fluid passages 22, respectively. The coefficient data can be derived as $Q(total)/Q(a)$, $Q(total)/Q(b)$, $Q(total)/Q(c)$ . . . , when a specified total flow value is $Q(total)$ and the flow values of the measurement fluid passages 22 are $Q(a)$, $Q(b)$, $Q(c)$ . . . , respectively.

Then, actually, the gas flow values are measured in the measurement fluid passages 22, respectively. As described above, the flow value comparison unit 93 determines whether or not the measurement flow values include the erroneous measurement flow value. Then, the total flow value calculation unit 94 calculates the total flow values of the measurement fluid passages 22 which are other than the measurement fluid passage 22 determined as having the erroneous measurement flow value, from the coefficient data and the flow values measured in the measurement fluid passages 22 which are other than the measurement fluid passage 22 determined as having the erroneous measurement flow value. Then, the total flow value calculation unit 94 calculates the average flow value of the total flow values of the measurement fluid passages 22 which are other than the measurement fluid passage 22 determined as having the erroneous measurement flow value, and decides this average flow value as the total flow value.

In this configuration, the total gas flow values can be derived from the flow gas values of the measurement fluid passages 22, respectively.

(Modified Example of Fluid Passage Configuration)

In the gas meter device 1 of the present embodiment, the fluid passages placed in parallel between the input buffer 21 and the outlet buffer 23 are the measurement fluid passages 22 which are capable of measuring the gas flow values, respectively. However, this configuration is merely exemplary. At least two or more fluid passages, of the plural fluid passages placed in parallel may be the measurement fluid passages 22 each including the upstream ultrasonic sensor 4, the downstream ultrasonic sensor 5, and the auxiliary control unit 6.

In this configuration, the main control unit 9 obtains the gas flow values of the measurement fluid passages 22, from only the fluid passages (measurement fluid passages 22), in which the flow value obtaining unit 91 includes the auxiliary control units 6, and create the flow value data table 71 based on these gas flow values.

That is, the average flow value calculation unit 92 calculates the average flow value of the flow values measured in the fluid passages (measurement fluid passages 22) provided with the auxiliary control units 6, and the flow value comparison unit 93 determines whether or not the flow values measured in the fluid passages (measurement fluid passages 22) provided with the auxiliary control units 6 include the erroneous measurement flow value.

In this configuration, even when the gas flow values of the fluid passages 22 are obtained, and summed up, the total flow value of the gas meter device 1 cannot be attained.

For this reason, as in the above described "Modified example 3 of total flow value calculation method", the total flow value calculation unit 94 calculates the total flow values from the gas flow values measured in the measurement fluid passages 22 which are other than the measurement fluid passage 22 determined as having the erroneous measurement flow value by the flow value comparison unit 93. Then, the total flow value calculation unit 94 calculates the average flow value of these total flow values and decides this average flow value as the total flow value of the gas which has flowed through the gas meter device 1.

Although in the above embodiment, the gas meter device 1 which measures the gas usage amount is exemplarily described, the measurement target fluid is not limited to the gas but may be any fluid.

Numerous improvements and alternative embodiments of the invention will be apparent to those skilled in the art in view of the foregoing description. Accordingly, the description is to be construed as illustrative only, and is provided for the purpose of teaching those skilled in the art the best mode of cal-lying out the invention. The details of the structure and/or function may be varied substantially without departing from the spirit of the invention.

INDUSTRIAL APPLICABILITY

A fluid meter device of the present invention is especially effectively applicable to a fluid meter device which includes plural fluid passages to measure the flow value of the gas of a large amount, and measures the fluid total flow value from the flow values of the fluid flowing though the plural fluid passages, respectively.

What is claimed is:

1. A fluid meter device including an inlet into which a fluid flows, and an outlet from which the fluid flows out, and being configured to derive a flow value of the fluid flowing from the inlet to the outlet, the fluid meter device comprising:
   plural measurement fluid passages provided in parallel between the inlet and the outlet, a cross sectional area of each measurement fluid passage having substantially equal diameter;
   separate flow value measuring units provided in the plural measurement fluid passages, respectively, and configured to independently measure separate flow values of fluids flowing through the measurement fluid passages, respectively;
   an average flow value calculation unit configured to derive an average flow value of the separate flow values, by summing up the separate flow values except for a largest value and a smallest value; and
   a comparison/determination unit configured to obtain index values indicating a relation between the average flow value and the separate flow values, and determine whether or not each of the index values is equal to or larger than a predetermined value.

2. The fluid meter device according to claim 1, comprising:
   a total flow value calculation unit configured to derive the flow value of the fluid flowing from the inlet to the outlet, based on the separate flow values which are other than the separate flow value as to which the comparison/determination unit determines that the index value is equal to or larger than the predetermined value.

3. The fluid meter device according to claim 1,
   wherein the comparison/determination unit derives as the index values difference values between the average flow value and the separate flow values, and determines whether or not each of the difference values is equal to or larger than the predetermined value.

4. The fluid meter device according to claim 3,
   wherein the predetermined value is set based on the average flow value derived by the average flow value calculation unit.

5. The fluid meter device according to claim 1,
   wherein the comparison/determination unit derives as the index values ratio values between the average flow value and the separate flow values, and determines whether or not each of the ratio values is equal to or larger than the predetermined value.

* * * * *